United States Patent
Fukushima et al.

(10) Patent No.: US 8,149,220 B2
(45) Date of Patent: Apr. 3, 2012

(54) POSITION DETECTOR AND DISPLAY DEVICE HAVING THE SAME

(75) Inventors: Masamitsu Fukushima, Saitama (JP); Masamitsu Ito, Minamisaitama-gun (JP); Toshihiko Horie, Ageo (JP)

(73) Assignee: Wacom Co., Ltd., Saitama (JP)

( * ) Notice: Subject to any disclaimer, the term of this patent is extended or adjusted under 35 U.S.C. 154(b) by 948 days.

(21) Appl. No.: 12/142,717

(22) Filed: Jun. 19, 2008

(65) Prior Publication Data

US 2009/0160790 A1 Jun. 25, 2009

(30) Foreign Application Priority Data

Jun. 22, 2007 (JP) ................... 2007-165469

(51) Int. Cl.
*G06F 3/041* (2006.01)
*G06F 3/046* (2006.01)
(52) U.S. Cl. ...................... 345/173; 178/18.08
(58) Field of Classification Search .................. 345/173; 178/18.08
See application file for complete search history.

(56) References Cited

U.S. PATENT DOCUMENTS

| | | | |
|---|---|---|---|
| 4,956,526 A | | 9/1990 | Murakami |
| 5,130,500 A | * | 7/1992 | Murakami et al. ......... 178/18.08 |
| RE39,475 E | | 1/2007 | Murakami |
| 2005/0030294 A1 | * | 2/2005 | Ahn et al. ................. 345/173 |
| 2005/0270272 A1 | * | 12/2005 | Shi ........................ 345/173 |
| 2006/0267580 A1 | | 11/2006 | Fukushima et al. |

FOREIGN PATENT DOCUMENTS

| | | |
|---|---|---|
| EP | 0 159 498 A1 | 10/1985 |
| EP | 1 314 964 A1 | 5/2003 |
| JP | 06-309085 A | 11/1994 |
| JP | 7115291 A | 5/1995 |
| JP | 10-049287 A | 2/1998 |

OTHER PUBLICATIONS

Chinese Office Action, for Corresponding Chinese Application No. 200810128691.8, dated Nov. 30, 2011, 2 pages.

Extended European Search Report, for Corresponding European Application No. 08158553.1, dated Dec. 14, 2011, 3 pages.

* cited by examiner

*Primary Examiner* — Amr Awad
*Assistant Examiner* — Jonathan Boyd
(74) *Attorney, Agent, or Firm* — Seed IP Law Group PLLC (57) ABSTRACT

A position detector is disclosed, which includes a sensor substrate having a sensor coil for receiving an electromagnetic wave output from a position indicator, and a magnetic path plate that has an area equal to or larger than an area in which the sensor coil is arranged on the sensor substrate. The magnetic path plate is formed by stacking an amorphous layer and a non-amorphous layer, which is formed of metal with relative magnetic permeability lower than that of the amorphous layer. Such magnetic path plate is arranged on a side of the sensor substrate opposite to a side facing the position indicator.

4 Claims, 12 Drawing Sheets

POSITION DETECTOR AND DISPLAY DEVICE HAVING THE SAME

CROSS REFERENCE TO RELATED APPLICATION

The present invention contains subject matter related to Japanese Patent Application JP 2007-165469 filed in the Japanese Patent Office on Jun. 22, 2007, the entire contents of which being incorporated herein by reference.

BACKGROUND OF THE INVENTION

1. Field of the Invention

The invention relates to a position detector on which a user indicates positions with a pen-shaped position indicator, and a display device having the position detector, and particularly to a position detector for detecting positions utilizing an electromagnetic effect.

2. Description of the Related Art

There are various kinds of input devices, such as keyboards, mice, and joysticks, utilized with electronic apparatuses such as personal computers (PCs) and PDAs (Personal Digital Assistants). Among these input devices, there is a so-called pen tablet that allows a user to input coordinates by drawing images or graphics on a flat-board device using a pen-shaped input device.

Figure 1:
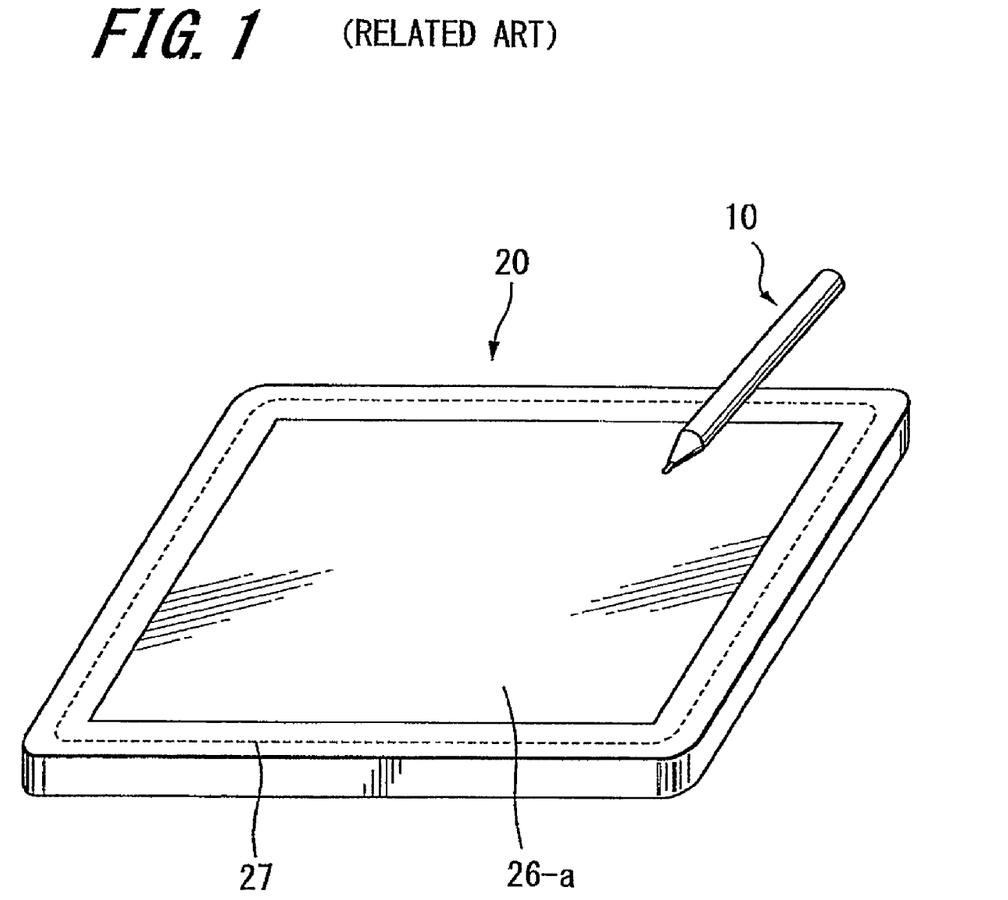
FIG. 1 is a perspective view illustrating an overall configuration example of a position detector according to the related art.

FIG. 1 is a perspective view illustrating a configuration example of a pen tablet. The pen tablet shown in FIG. 1 includes a position indicator (pen) 10 having a pencil shape, and a sensor (tablet) 20 including a sensor substrate 27 and a drawing region 26-a. The sensor substrate 27, which will be described in detail later, includes coil(s) for detecting positions; that is, the induced voltage generated in the coil(s) is used to detect coordinates of positions indicated by the position indicator 10 in the drawing region 26-a of the sensor 20.

The pen tablet of this kind includes a tablet PC which includes the sensor 20 incorporated in a display of a computer (particularly, a note-type personal computer). A user inputs coordinates of arbitrary positions by directly drawing on the surface of the display with the position indicator.

First, the principle of such a pen tablet will be described. It is noted that the word "pen tablet" is used synonymously with the word "position detector" in the present description.

The position indicator 10 and the sensor 20 in FIG. 1 each include coil(s). Operation of the position indicator 10 and the sensor 20 will later be described in detail; however, overviews thereof are briefly described as follows. An electromagnetic wave is first transmitted from the sensor 20 side coil(s) in a short period of time. The position indicator 10 side coil receives the electromagnetic wave and resonates at the substantially same frequency as that of the received electromagnetic wave. This means that energy is stored in the position indicator 10 side resonant circuit. The electromagnetic wave transmitted from the sensor side 20 coil(s) subsequently stops, and the energy stored in the resonant circuit is transmitted from the position indicator 10 side coil as an electromagnetic wave.

The electromagnetic wave transmitted from the position indicator 10 side coil is then received by the sensor 20 side coil(s), so that the current coordinates indicated by the position indicator 10 are determined.

Figure 2:
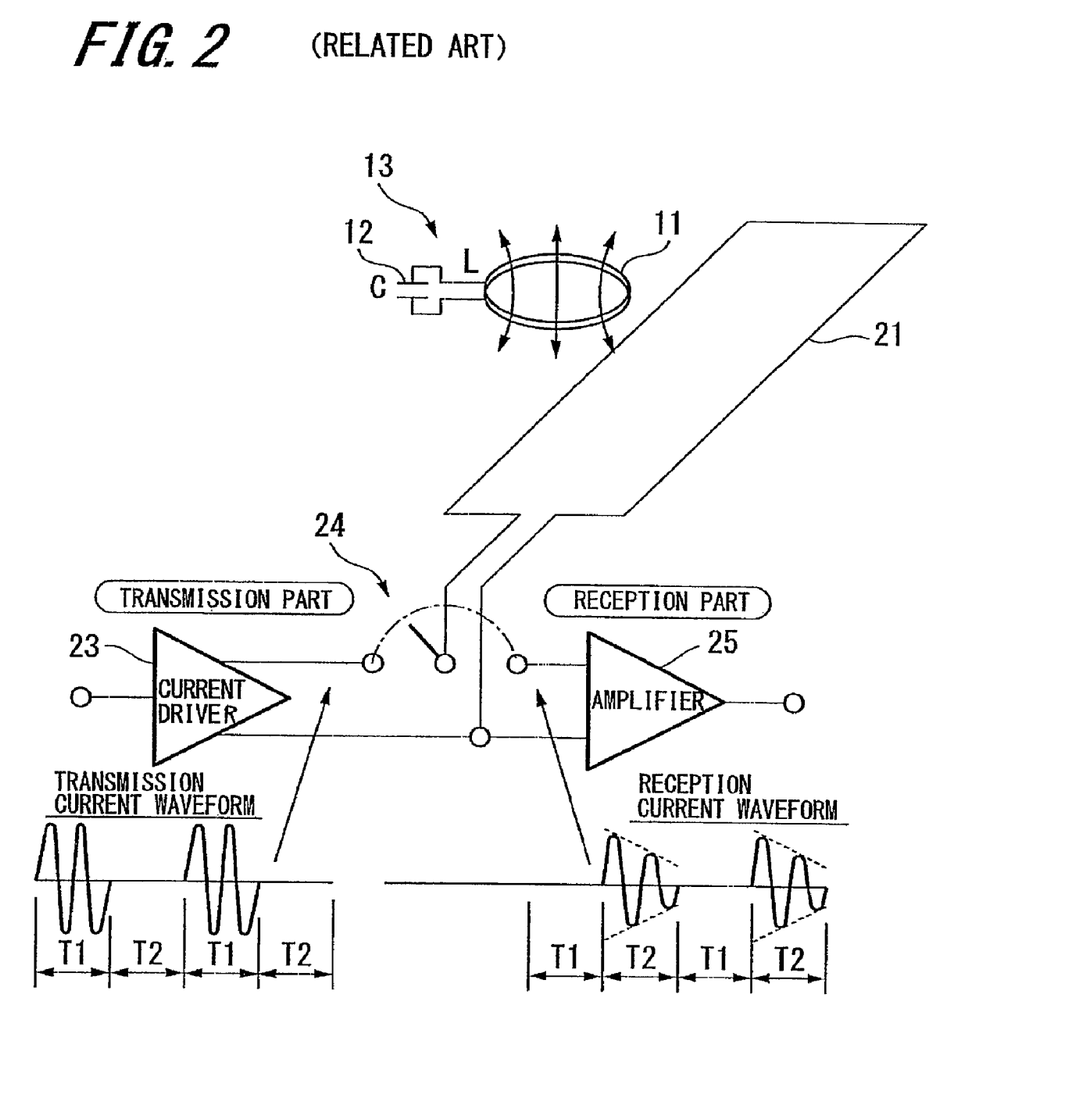
FIG. 2 is a schematic diagram illustrating the detecting principle of the position detector having one sensor coil according to the related art.

Below describes in detail how coordinates indicated by the position indicator 10 are detected. FIG. 2 is a conceptual view illustrating a position detector (i.e., a pen tablet) having one sensor coil 21 in the sensor 20. The "coil" provided at the sensor 20 side is referred to as a "sensor coil". The position indicator 10 includes a resonant circuit 13 having a coil 11 and a capacitor 12. The "coil" 11 is hereafter referred to as a "pen coil".

The sensor coil 21 is provided at the sensor 20 side, and is connected to a transmitting-receiving changeover switch 24. The changeover switch 24 is connectable to a current driver 23 and to an amplifier 25, and switches between the current driver 23 and the amplifier 25, both of which are connected to the sensor coil 21.

Next, FIG. 2 illustrates operational steps of the position detector having such a configuration.

(1) First, the transmitting-receiving changeover switch 24 is connected to the current driver 23 for a certain amount of time (T1), and supplies an alternating current signal to the sensor coil 21 to generate an electromagnetic wave.

(2) The electromagnetic wave output from the sensor coil 21 is received by the pen coil 11, causing the resonant circuit 13 of the position indicator 10 to resonate.

(3) After the certain amount of time (T1) has elapsed, the transmitting-receiving changeover switch 24 switches to the amplifier 25 for a certain amount of time (T2).

(4) Then, during T2, no electromagnetic wave is supplied to the position indicator 10, and energy stored in the resonant circuit 13 causes the pen coil 11 to transmit an electromagnetic wave. While the electromagnetic wave is being transmitted for the certain amount of time (T2), no energy is supplied from outside to the resonant circuit 13, such that the amplitude of the electromagnetic wave transmitted is gradually attenuated, as shown in the reception current waveform in FIG. 2.

(5) The transmitting-receiving changeover switch 24 switches to the current driver 23 again for the certain amount of time (T1), and the same operation described in (1) is carried out.

The electromagnetic wave is transmitted and received in this manner between the sensor 20 side coil and the position indicator 10 side coil. In a case where a plurality of sensor coils 21 are arranged in the sensor 20, the coordinate indicated by the position indicator 10 is determined by detecting which one of the sensor coils the position indicator side coil is communicating with.

Figure 3:
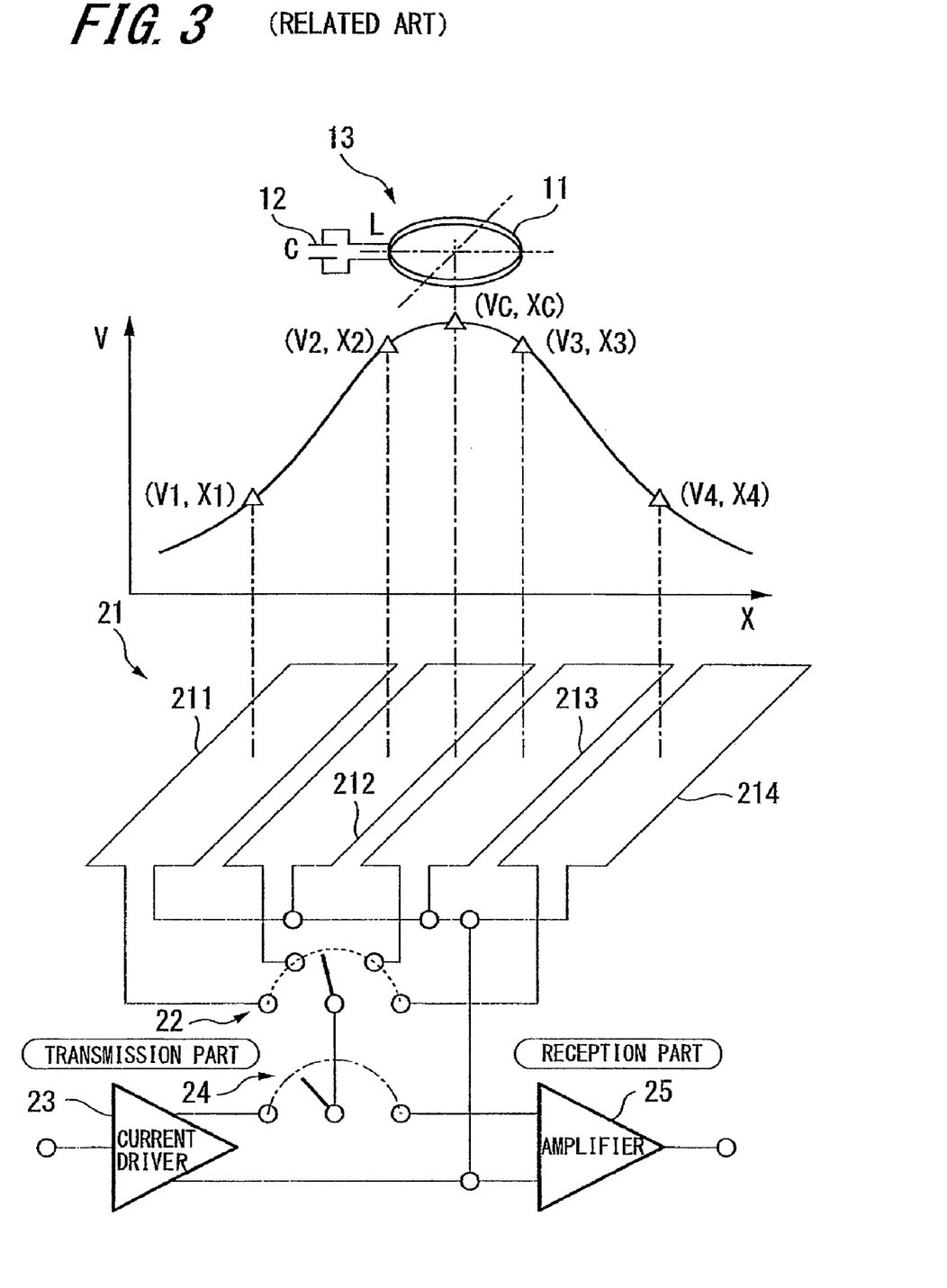
FIG. 3 is a schematic diagram illustrating the detecting principle of the position detector having a plurality of sensor coils according to the related art.

FIG. 3 is a view conceptually illustrating the distribution of induced voltage generated by the position indicator 10 in the sensor 20. The position indicator 10 includes the resonant circuit 13 having the coil 11 and the capacitor 12. The sensor 20 includes a plurality of sensor coils 21, which are illustrated as four sensor coils 211 to 214 in the example of FIG. 3.

The sensor coils 211 to 214 are each connectable to a sensor coil changeover switch 22, with which the sensor coils are individually operated. The sensor coil changeover switch 22 is connected to the transmitting-receiving changeover switch 24, so that the sensor coil 21 is switched either to transmit or to receive an electromagnetic wave. The transmitting-receiving changeover switch 24 is also connectable to the current driver 23 and to the amplifier 25. The current driver 23 drives an alternating current signal.

Below describes how a coordinate indicated by the position indicator 10 is detected by the plurality of the sensor coils 21 disposed in the sensor 20.

(a) First, the sensor coil changeover switch 22 is connected to the sensor coil 211, and the transmitting-receiving changeover switch 24 is connected to the current driver 23. The sensor coil 211 transmits an electromagnetic wave in this manner.

(b) Next, the electromagnetic wave is transmitted and received between the position indicator 10 and the sensor 20 via the transmitting-receiving changeover switch 24, as described above in steps (1) through (5), and hence the value of the induced voltage of the sensor coil 211 is detected.

(c) The sensor coil changeover switch 22 sequentially switches between the sensor coils 212, 213, 214 to operate the aforementioned steps (1) through (5).

The sensor coil changeover switch 22 sequentially switches between the sensor coils 211, 212, 213, 214 to detect the magnitude of the induced voltage for each of the respective sensor coils 211, 212, 213, 214. Thus, the intensity distribution of electromagnetic wave output from the position indicator 10 is obtained for each time the position indicator 10 is placed on or near the sensor coils 211, 212, 213, or 214, as shown in the graph of FIG. 3. The positions of the sensor coils 211 to 214 are represented by points (X1 to X4) plotted on an X-axis of the graph.

The sensor coils 21 each have a long and thin shape, some of which are arranged in a longitudinal axis (Y-axis) direction (not shown), and some of which are arranged in a short axis (X-axis) direction. In FIG. 3, the sensor coils 21 are arranged in the short axis direction; that is, the sensor coils 21 are arranged along the X-axis direction. The X coordinates on the graph correspond to the central points of the short axes of the sensor coils 21. The X coordinates are optionally determined either as the central points of the sensor coils 21 as described, or as other points of the sensor coils 21.

The induced voltage V1 to V4 detected at the respective sensor coils 211 to 214 are plotted along the X-axis at X-coordinates X1 to X4 to approximate a curve, to thereby produce the graph in FIG. 3. In this graph, the peak of the curve corresponds to a coordinate Xc representing the central axis of the pen coil 11. Thus, X coordinates indicated by the position indicator 10 can be calculated. Likewise, other sensor coils may be arranged to intersect with these sensor coils 21 at right angles, so that Y coordinates indicated by the position indicator 10 can also be calculated.

Even when the position indicator 10 is moved at an interval shorter than the interval between the sensor coils 21, the distance between the pen coil 11 and the adjacent sensor coils 21 will still vary, thereby slightly changing the induced voltage generated in each of the sensor coils 21. Thus, the coordinates indicated by the position indicator 10 can be calculated based on this change.

In this case, the resolution of the coordinates that can be detected is higher than the interval between the sensor coils 21. To this end, it is preferable that the sensor coils 21 detect the induced voltage as precise as possible. The more precisely that coordinates can be indicated by the position indicator 10, and hence detected, the higher resolution the position detector can be.

Figure 4:
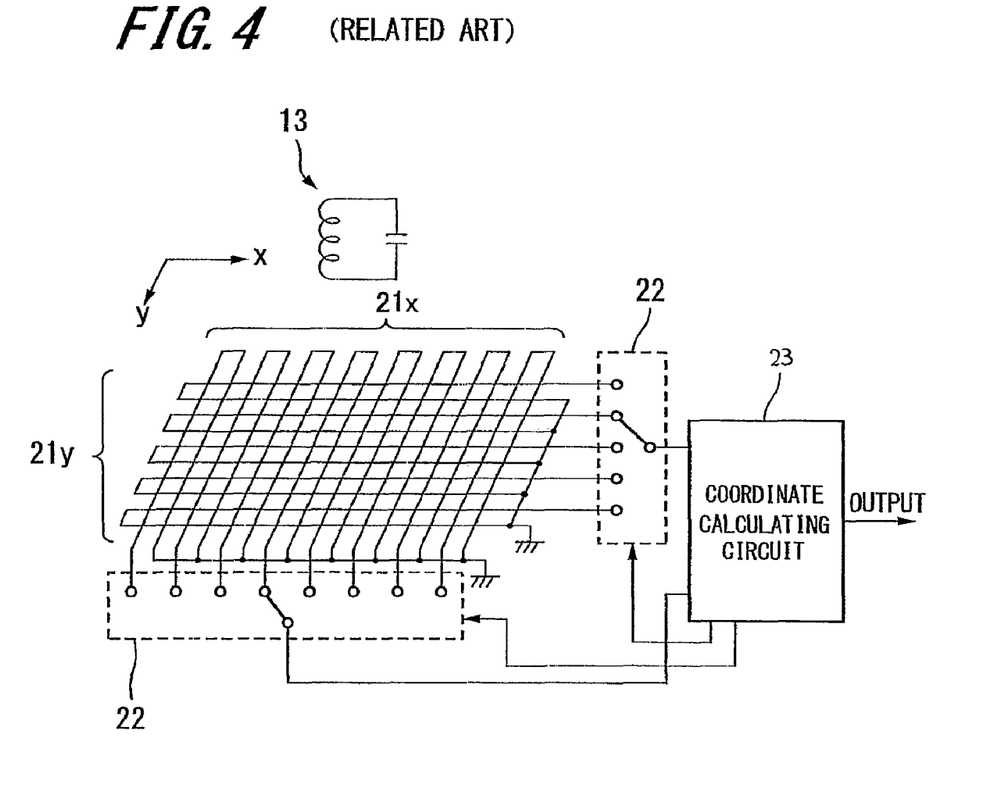
FIG. 4 is a schematic diagram illustrating the detecting principle of a typical position detector according to the related art.

FIG. 4 is a schematic view illustrating a structure of a typical position detector (i.e., a pen tablet). Since the position detector typically needs to detect X coordinates and Y coordinates, the sensor coils X (21X) and the sensor coils Y (21Y) are respectively arranged corresponding to the X-axis and Y-axis. The transmitting-receiving changeover switch 24, current driver 23, and amplifier 25, shown in FIG. 3, are arranged inside a coordinate calculating circuit 23.

The sensor coils X and the sensor coils Y are each configured to perform the aforementioned operations (a) through (c), so that the position detector obtains X coordinates and Y coordinates of the position indicator 10.

The user can input information with the position indicator 10 in a manner similar to drawing characters and pictures on paper with a pen. It is desirable to be able to change thickness of lines being drawn, by adjusting pen pressure or angles of the position indicator 10, such as by drawing lines with the position indicator inclined. Thus, the pen pressure or angles of inclination of the position indicator 10 need to be detected to achieve the change in drawing lines.

Figure 5:
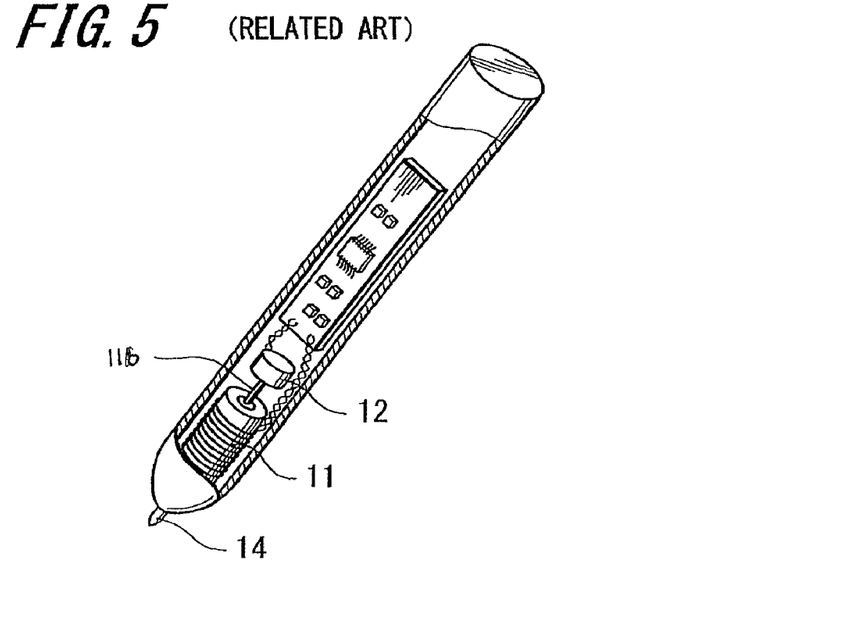
FIG. 5 is a partially cut-away perspective view illustrating an internal configuration example of the position indicator according to the related art.

FIG. 5 illustrates one example of the position indicator 10 capable of performing such operation. As illustrated in the figure, the pen coil 11 surrounds the core 11b extending from a pen tip 14, and a capacitor 12 is engaged with one end of the core 11b. In the position indicator 10, when pressure is applied to the pen tip 14, the core 11b is moved to press the capacitor 12. The capacitor 12 usually has two electrodes facing each other, and a dielectric is located therebetween.

When a material used for the dielectric has the permittivity that varies with pressure, capacitance of the capacitor 12 can vary when force is applied to the pen tip 14. Thus, the resonance frequency of the resonant circuit 13 can vary based on the pen pressure.

The electromagnetic induction-type position detector transmits and receives an electric signal between the position indicator 10 and the sensor 20, utilizing electromagnetic induction. In other words, radio waves are transmitted and received between the position indicator 10 and the sensor 20. The electromagnetic wave is generally extremely weak, and tends to be adversely interfered with by an external noise. Further, the position detector should be able to accurately detect induced voltage generated by the pen coil 11 in order to achieve higher resolution, and to that end the sensor coils 21 should receive as little noise as possible.

Japanese Unexamined Patent Application Publication H07-115291 discloses a shield plate formed by arranging amorphous metal ribbons in parallel to form a ribbon plate, and stacking an aluminum plate on top of the resulting ribbon plate.

SUMMARY

There have been manufactured mobile electronic apparatuses each incorporating a pen tablet. In manufacturing such mobile electronic apparatuses, an entire mobile electronic apparatus preferably has a smaller size and is lightweight to improve its portability. Such a small, lightweight mobile electronic apparatus incorporating a pen tablet is often formed by stacking a sensor substrate 27 (FIG. 1), including the sensor coils 21, on an electronic circuit.

However, when the sensor substrate 27 is stacked on the electronic circuit, the magnetic field output from the sensor coils 21 of the sensor substrate to the position indicator 10 is attenuated due to the interference from metallic portions of the electronic circuit, thereby lowering the magnetic field received by the position indicator 10. In addition, if the sensor substrate 27 is stacked on the electronic circuit, the noise generated from the electronic circuit interferes with the sensor coils 21, and consequently the sensor coils 21 may fail to detect the coordinates of the position indicator 10 with accuracy.

Thus, it is desirable to reduce interference due to noise such as electromagnetic interference (EMI), so as to reduce attenuation of the magnetic field or the like output from the sensor coils 21 in manufacturing the mobile electronic apparatus incorporating a pen tablet function.

One technique to prevent the sensor coils 21 from receiving interference due to the noise generated by the electric circuit involves providing electromagnetic shielding such as aluminum foil and copper foil between the sensor coils 21 and the electric circuit, so that the noise, such as the electromagnetic waves, is intercepted by the electromagnetic shielding, thereby reducing the interference with the sensor coils 21. However, although providing the electromagnetic shielding for the sensor coil 21 can reduce the noise generated by the electric circuit, the magnetic field induced by the sensor coils 21 generates an eddy current in the electromagnetic shielding, thereby attenuating the magnetic field generated by the sensor coils 21.

To prevent the magnetic field from being attenuated due to the eddy current, a silicon steel plate may be employed in place of the electromagnetic shielding, such as the aluminum foil. The silicon steel plate has a property to pass a magnetic flux therethrough, and provides the effect of electromagnetic shielding if the thickness thereof is adjusted approximately to 0.5 mm. However, since a silicon steel plate is generally heavier than aluminum foil or the like, the entire mobile electronic apparatus will thus become heavy. A silicon steel plate is therefore unsuitable for being incorporated in the mobile electronic apparatus. Moreover, since a silicon steel plate is generally more expensive than aluminum foil or the like, the cost of the mobile electronic apparatus will become relatively high. This is another reason that a silicon steel plate is unsuitable for being incorporated in the mobile electronic apparatus.

An amorphous ribbon is generally known as a material to pass through the magnetic flux without attenuating the magnetic field. Thus, an amorphous ribbon may be employed instead of a silicon steel plate. However, since an amorphous ribbon is formed with a thickness of approximately 50 μm, the amorphous ribbon fails to function as electromagnetic shielding.

An embodiment of the invention provides a magnetic path plate that functions as electromagnetic shielding, that will not attenuate the magnetic field generated by the position indicator 10 or the sensor coils 21, and that will not easily be affected by the magnetic noise from the outside; a position detector having such magnetic path plate; and a display device having such position detector.

An embodiment of the invention provides a magnetic path plate that functions as electromagnetic shielding and that will pass through magnetic flux without attenuating the magnetic field generated by the position indicator 10 or the sensor coils 21, and that will be less expensive; a position detector having such magnetic path plate; and a display device having such position detector.

Further, a display device according to an embodiment of the invention includes a sensor substrate having a sensor coil for receiving an electromagnetic wave output from a position indicator, a magnetic path plate having an area equal to or larger than an area in which the sensor coil is arranged on the sensor substrate, and a display unit provided on one surface of the sensor substrate. In the display device, the magnetic path plate is formed by stacking an amorphous layer and metal having relative magnetic permeability lower than that of the amorphous layer, and the magnetic path plate is arranged on a surface of the sensor substrate 27 opposite to a surface of the sensor substrate 27 facing the position indicator. Note that a display device according to one embodiment of the invention may include a sensor substrate formed of a transparent material, and a display unit may be placed between the sensor substrate and the magnetic path plate.

An embodiment of the invention provides a position detector that will not receive interference due to noise generated by an electronic circuit, and a display device that includes such position detector. In the embodiment, the magnetic path plate includes amorphous metal, and metal having relative magnetic permeability lower than that of the amorphous metal, such as aluminum. Since aluminum has a lighter weight than the amorphous metal, the position detector and the display device according to the embodiment can attain lightweight.

The invention further provides a magnetic path plate included in a position detector, which comprises a stack of an amorphous layer and a non-amorphous layer formed of metal with relative magnetic permeability lower than that of the amorphous layer. The invention further provides a method for detecting a position indicated by a position indicator on a sensor substrate based on the detection of an electromagnetic wave transmitted from the position indicator using sensor coils arranged on the sensor substrate, wherein the method includes providing a magnetic path plate adjacent to the side of the sensor substrate opposite the side facing the position indicator.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the invention will now be described with reference to accompanied drawings FIGS. 6 to 13.

Figure 6:
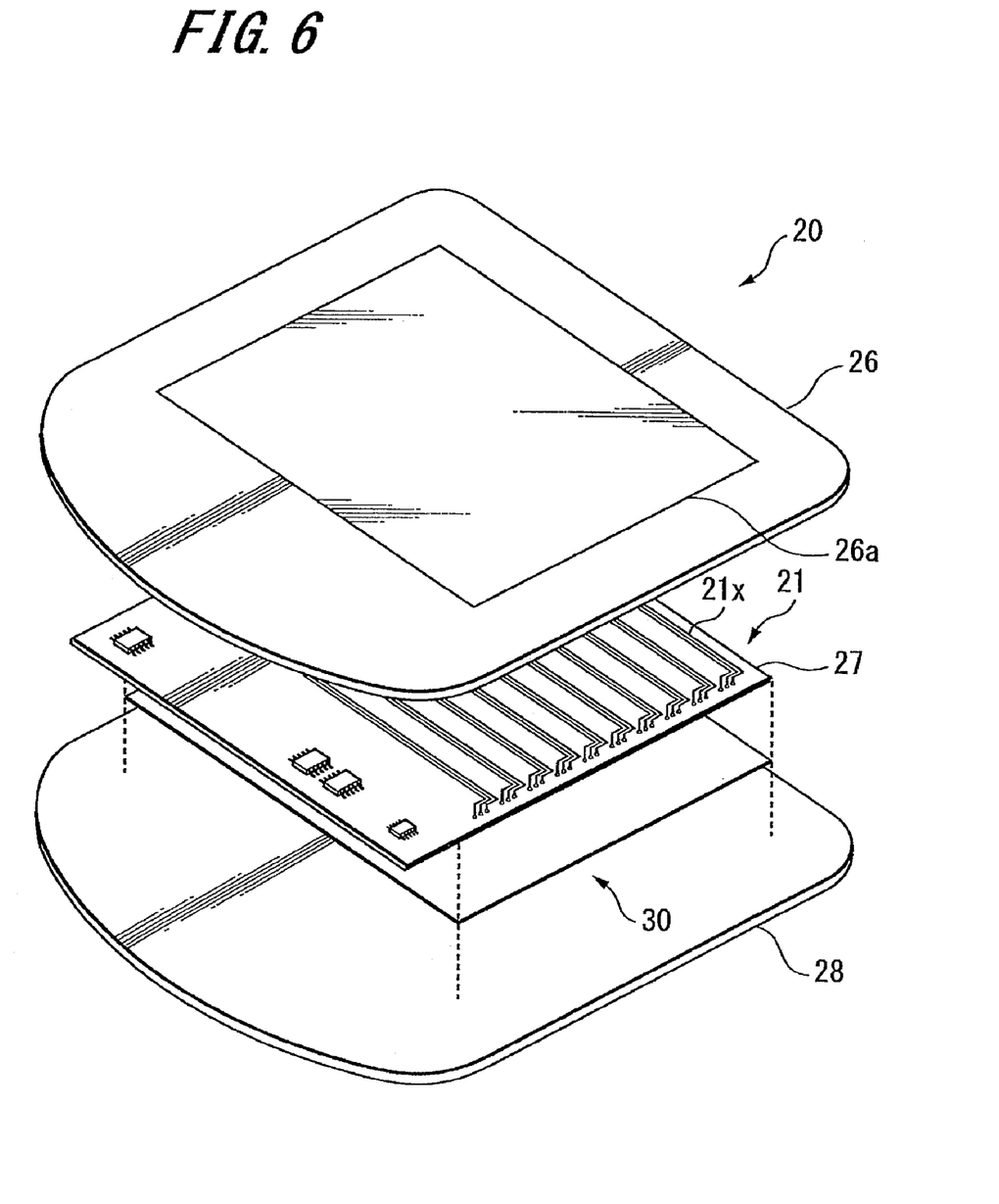
FIG. 6 is an exploded perspective view illustrating a position detector according to an embodiment of the invention.

FIG. 6 is an exploded perspective view illustrating a position detector 20 according to an embodiment of the invention. As shown in the figure, a sensor substrate 27 and a magnetic path plate 30 are arranged between an upper case 26 and a lower case 28. The upper case 26 includes a drawing plane 26a used for the position indicator 10 (not shown in FIG. 6). The magnetic path plate 30 is arranged on a surface (lower case 28 side) of the sensor substrate 27 opposite to a surface (upper case 26 side) of the sensor substrate 27 facing the position indicator 10. The sensor substrate 27 has at least one sensor coil 21 that detects a coordinate indicated by the position indicator 10.

The sensor coil 21 includes a sensor coil 21x for detecting x coordinates provided on one surface of the sensor substrate 27, and a sensor coil 21y (not shown in FIG. 6) for detecting y coordinates provided on the other surface thereof. It is preferable that the area in which the sensor coil 21 is arranged in the sensor substrate 27 has an equal size as the area of the drawing plane 26a.

As the sensor coil 21 receives an electromagnetic wave output from the position indicator 10, the magnetic path plate 30 functions to prevent the sensor coil 21 from receiving electromagnetic noise generated from a side opposite from the side facing the position indicator 10. Further, in a case where a metallic plate or the like is placed on a side of the sensor coil 21 opposite from the side facing the position indicator 10; that is, in a case where the position detector is placed on the metallic plate, the magnetic field generated by the sensor coil 21 can be prevented from being attenuated in the metallic plate. Accordingly, the magnetic path plate 30 can effectively function when the magnetic path plate 30 has an area equal to or larger than an area in which the sensor coil 21 is arranged. It is desirable that the magnetic path plate 30 has a still larger area to prevent the electromagnetic noise from obliquely entering the sensor substrate 27 on which the sensor coil 21 is arranged.

Figure 7A:
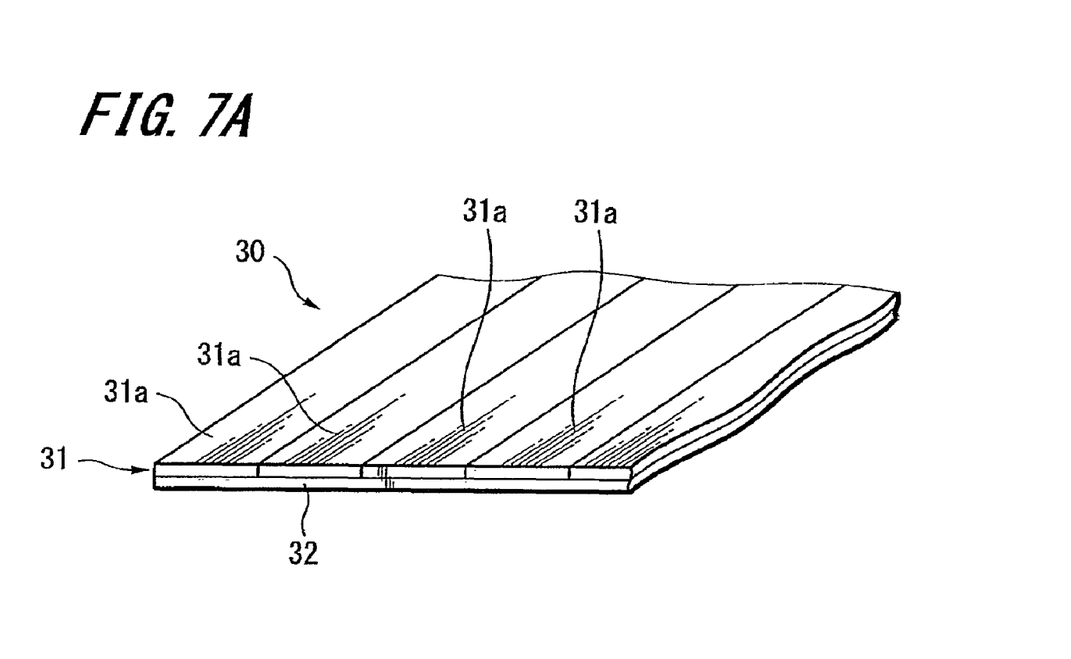
FIG. 7A is a perspective view illustrating one example of a magnetic path plate.
Figure 7B:
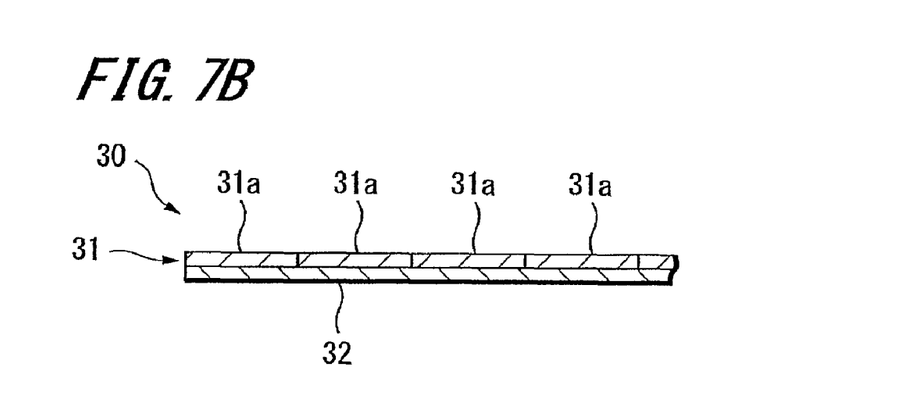
FIG. 7B is a cross-sectional view thereof according to an embodiment of the invention.

Next, the magnetic path plate 30 is described in detail. FIG. 7A is a partial perspective view illustrating a sample configuration of the magnetic path plate 30, and FIG. 7B is a sectional view thereof according to an embodiment of the invention. The magnetic path plate 30 includes an amorphous layer 31 and a non-amorphous layer 32 formed of metal with relative magnetic permeability lower than that of the amorphous layer 31. An example of metal used as the non-amorphous layer 32 includes aluminum. The amorphous layer 31 is formed by arranging a plurality of amorphous metal strips 31a in parallel with their longitudinal axes to form a plane.

The amorphous layer 31 is extremely thin (approximately 20 μm), so that electric shielding obtained may not be effective. The magnetic path plate 30 includes aluminum as metal having relative permeability lower than that of the amorphous layer 31. Since aluminum is light, the position detector made of aluminum can be made lighter as compared with the related art position detector made of a silicon steel plate. Further, cost can be reduced by using aluminum in manufacturing. It is noted that a material for forming a non-amorphous layer 32 is not limited to aluminum; any type of metal capable of providing electric shielding or having relative permeability lower than that of the amorphous layer 31 can be used.

Figure 8A:
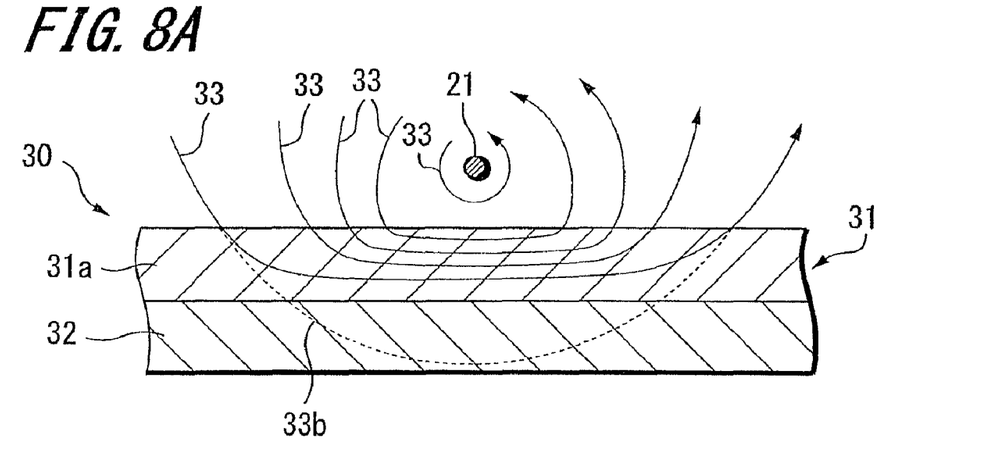
FIG. 8A is a cross-sectional view illustrating magnetic field lines of a sensor coil passing through the magnetic path plate.
Figure 8B:
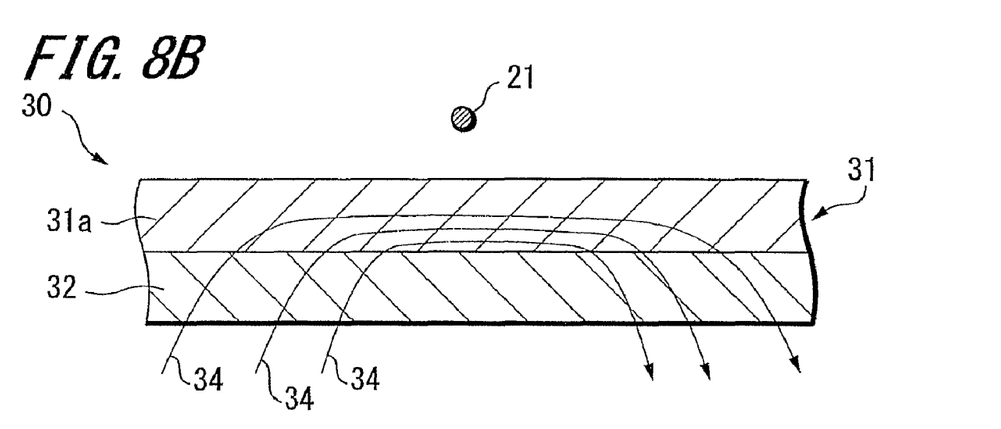
FIG. 8B is a cross-sectional view illustrating magnetic field lines of noise passing through the magnetic path plate, according to an embodiment of the invention.

FIGS. 8A, 8B are each a sectional view illustrating how the aforementioned magnetic path plate 30 forms magnetic flux paths. FIG. 8A illustrates how the magnetic flux 33 generated by a current through the sensor coil 21 passes through the amorphous layer 31 of the magnetic path plate 30. As shown in the figure, the magnetic flux 33 enters the amorphous metal strip 31a, proceeds along the amorphous layer 31, and comes out of the surface of the amorphous metal strip 31a of the magnetic path plate 30. In other words, the amorphous layer 31 forms the magnetic paths through which the magnetic flux passes. The dotted line in the figure shows a magnetic force line 33b in a case where no amorphous layer 31 is provided. In comparing the magnetic path plate having the amorphous layer 31 (solid line) with that without the amorphous layer 31 (dotted line), the magnetic force lines pass through the amorphous layer 31 and come out of the surface of the amorphous layer 31 in a case where the magnetic path plate 30 has the amorphous layer 31. This means that the amorphous layer 31 forms the magnetic paths.

Likewise, FIG. 8B illustrates how magnetic flux 34 enters the amorphous metal strip 31a from a side opposite to the side facing the sensor coil 21 provided above the magnetic path plate 30. The magnetic flux 34 is so-called "magnetic noise". As shown in the figure, the magnetic flux 34, which is noise, enters from the non-amorphous layer 32 into the amorphous layer 31, and comes out again from the surface of the non-amorphous layer 32. Thus, the magnetic flux 34 or noise will not reach the sensor coil 21 due to the magnetic paths formed in the amorphous layer 31. Since the amorphous layer 31 forms the paths for the magnetic flux 33, 34, the magnetic flux will not penetrate beyond the amorphous layer 31, and hence, external magnetic noise will not interfere with the magnetic field generated by the sensor coil 21.

Figure 9:
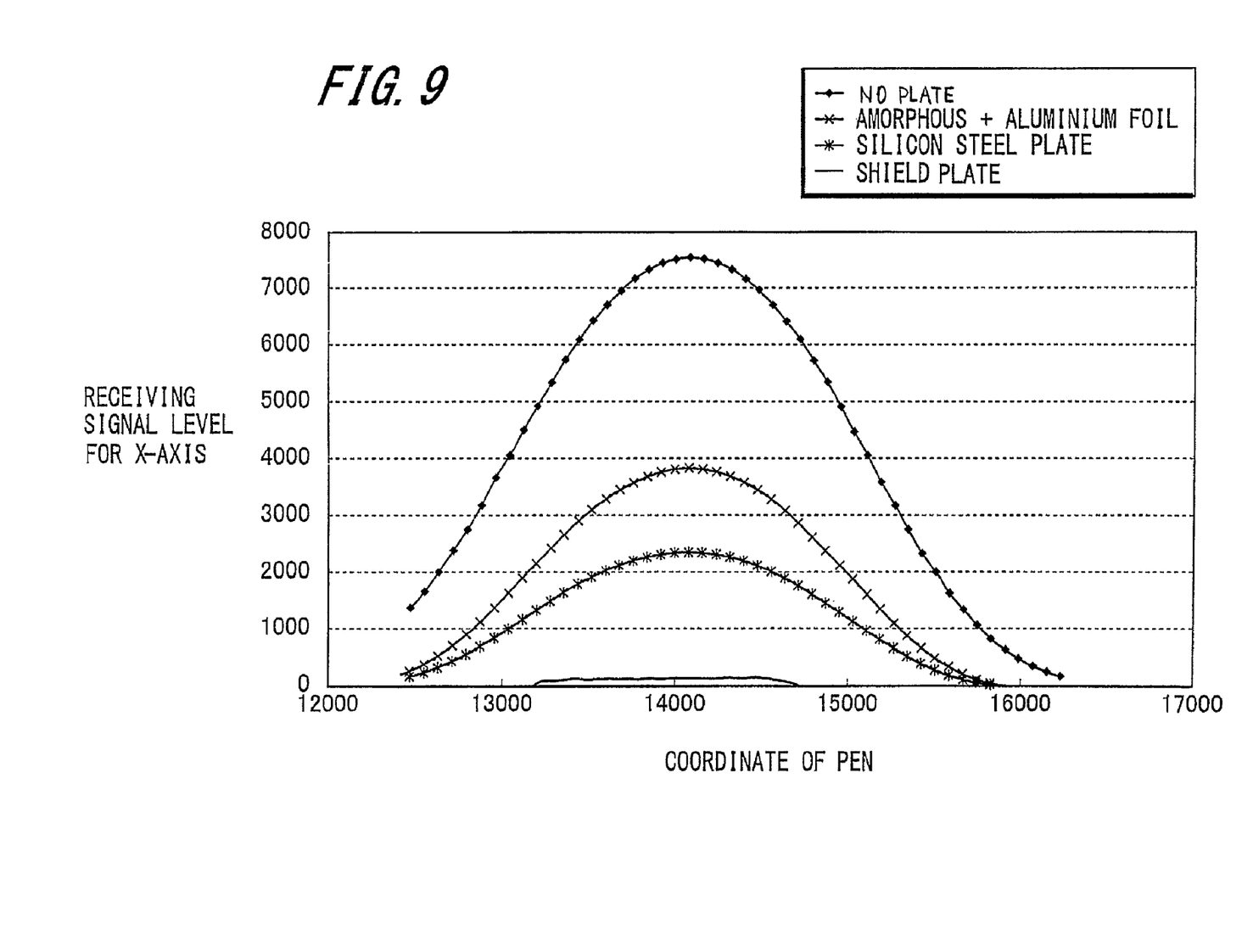
FIG. 9 is a characteristic diagram of curves indicating levels of receiving signals in various conditions for comparison purposes.

Next, an example that compares a position detector having the magnetic path plate 30 of the embodiment with a position detector having the related art shielding plate will be described in reference to a graph in FIG. 9. FIG. 9 shows the graph representing the induced voltage generated by the position indicator 10 that is measured in a region close to the pen tip 14. The coordinate of the pen tip 14 corresponds to the peak of the graph. The induced voltage is measured under the following three conditions: the detector having the related art electrostatic shielding, the detector having the related art silicon steel plate, and the detector having the shielding plate of this embodiment. A horizontal axis of the graph represents coordinates; however, the scale is arbitrarily set.

A symbol "♦" of the graph shows an outcome measured with the detector, when no magnetic path plate is placed beneath the sensor substrate 27, and which is free from noise. A symbol "x" of the graph shows an outcome measured with the detector having the magnetic path plate of the embodiment placed beneath the sensor substrate 27. A symbol "x" of the graph shows an outcome measured with the detector having the related art silicon steel plate placed beneath the sensor substrate 27, and a solid line of the graph shows an outcome measured with the detector having the related art electrostatic shielding. The outcome shows that the detector without the magnetic path plate shows the highest signal level received by the sensor coil. Further, the detector having the related art electrostatic shielding formed of an ordinary metallic plate shows almost no signal level.

As shown in FIG. 9, as compared to the detector having a silicon steel plate, the detector having the amorphous layer and the aluminum foil shows a signal level approximately twice that of the detector having the silicon steel plate, thereby clearly showing an increase in the received signal level. Since the aluminum foil is produced by expanding aluminum thinly, the obtained product is an aluminum layer. The graph shows that the detector having the amorphous layer and aluminum foil can acquire a higher signal level than the detector having the silicon steel plate.

Figure 10:
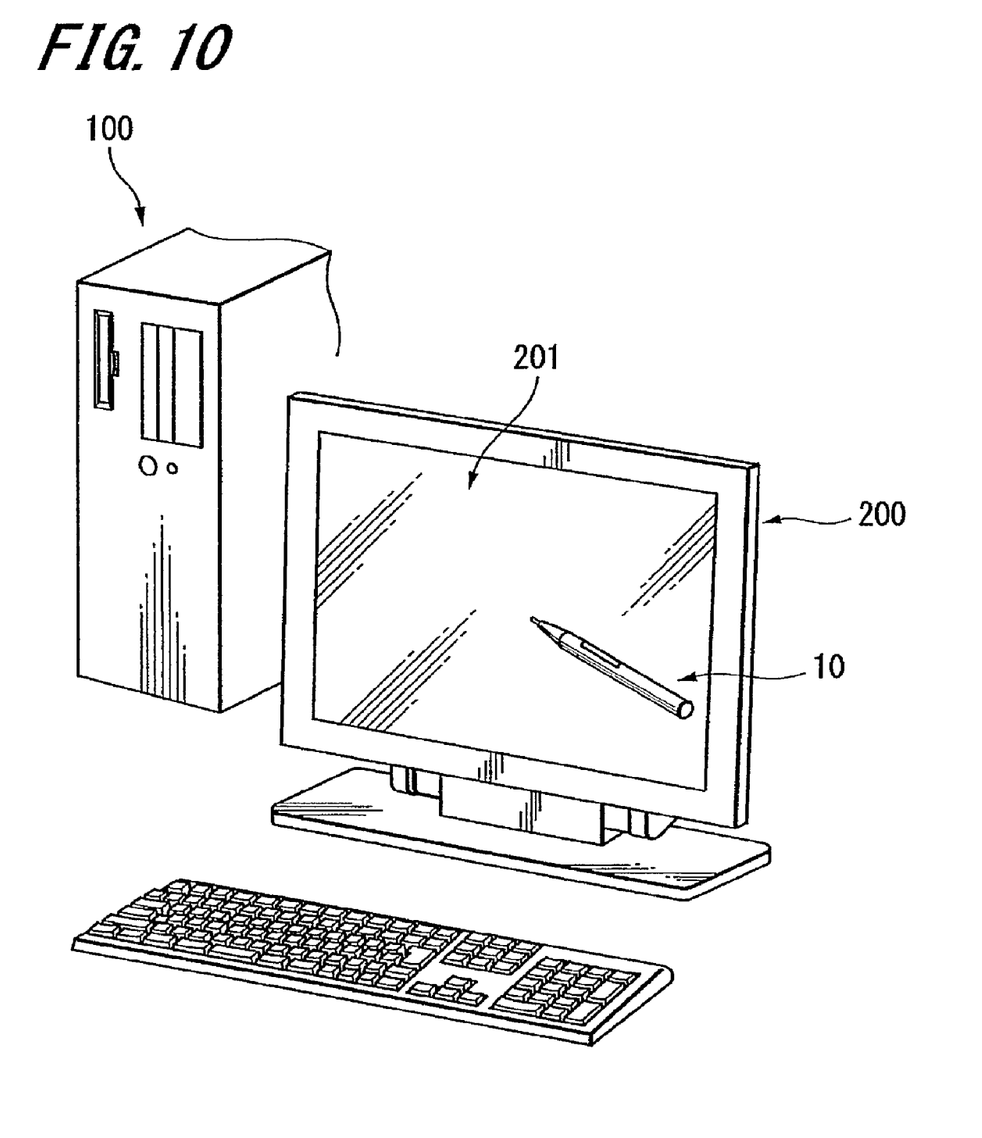
FIG. 10 is a perspective view illustrating one example of a personal computer utilizing the position detector according to an embodiment of the invention.

FIG. 10 is a configuration example of a computer apparatus employing a position detector according to an embodiment of the invention. In the configuration example, a display device 200 connected to a personal computer 100 includes a sensor 20 (not shown in FIG. 10), and a position indicator 10 that is operated on the screen of the display device 200 to indicate a coordinate.

Figure 11:
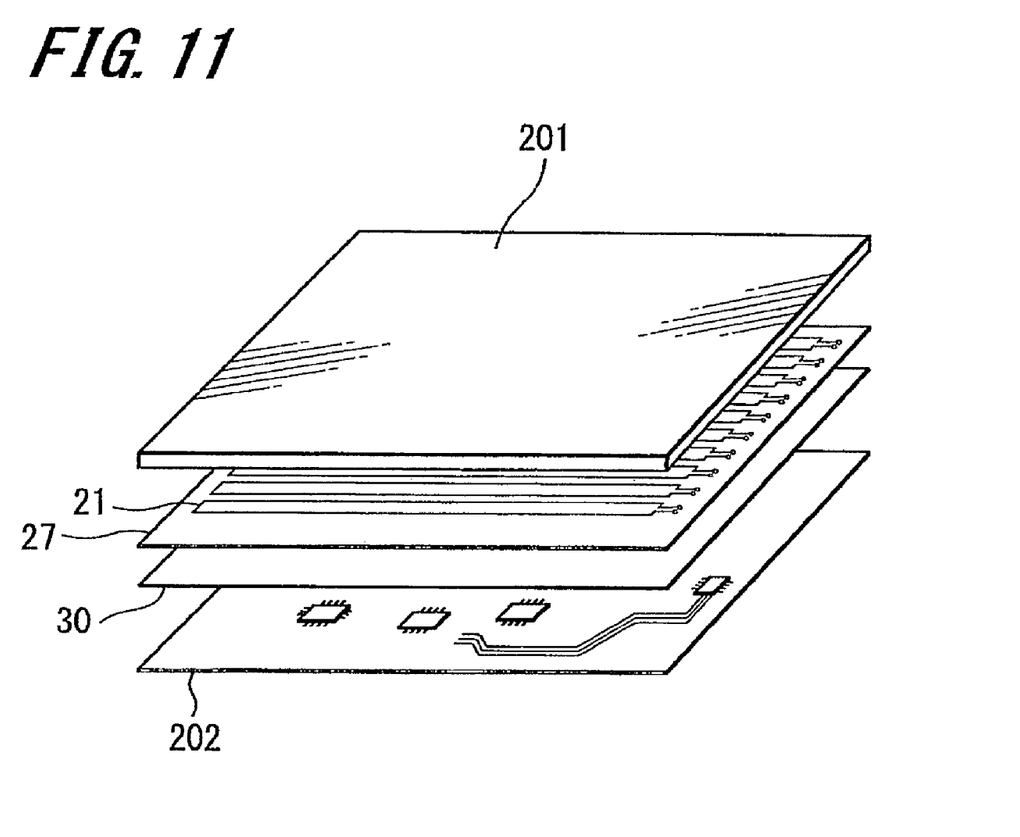
FIG. 11 is an exploded perspective view illustrating major parts of a display device according to an embodiment of the invention.

FIG. 11 is an exploded perspective view illustrating the main portions of the display device 200 shown in FIG. 10. As shown in the figure, the position indicator 10 can be placed on the surface side of a display panel 201. The sensor substrate 27 is placed beneath the side of the display panel 201 opposite from the side on which the position indicator 10 is to be placed, and the magnetic path plate 30 is placed beneath the sensor substrate 27. A driving circuit board 202 driving the display panel 201 is placed beneath the magnetic path plate 30. In other words, the magnetic path plate 30 is placed between the sensor substrate 27 and the driving circuit board 202. A display panel 201 in the illustrated example is a liquid crystal panel. The liquid crystal panel includes a glass substrate, a backlight, a polarizing plate or the like; the liquid crystal panel according to this embodiment includes all these components.

The display panel 201 having such configuration can cut off the noise generated by the driving circuit board 202 using the magnetic path plate 30. Thus, the user can operate the position indicator 10 to draw directly on the surface of the display device 200, thereby inputting coordinates in the personal computer 100. FIGS. 10 and 11 illustrate examples of the personal computer 100, in which a main body (e.g., a PC 100) and the display device 200 are separately configured; however, the main body and the display device can be integrally formed as in a note-type computer.

As described so far, since the magnetic path plate 30 is formed by stacking the amorphous layer 31 and an aluminum layer 32 in one embodiment, the electromagnetic noise generated by the driving circuit board 202 can be cut off, attenuation of the magnetic field due to eddy current can be prevented, and further, the weight of the position detector can be reduced.

Figure 12A:
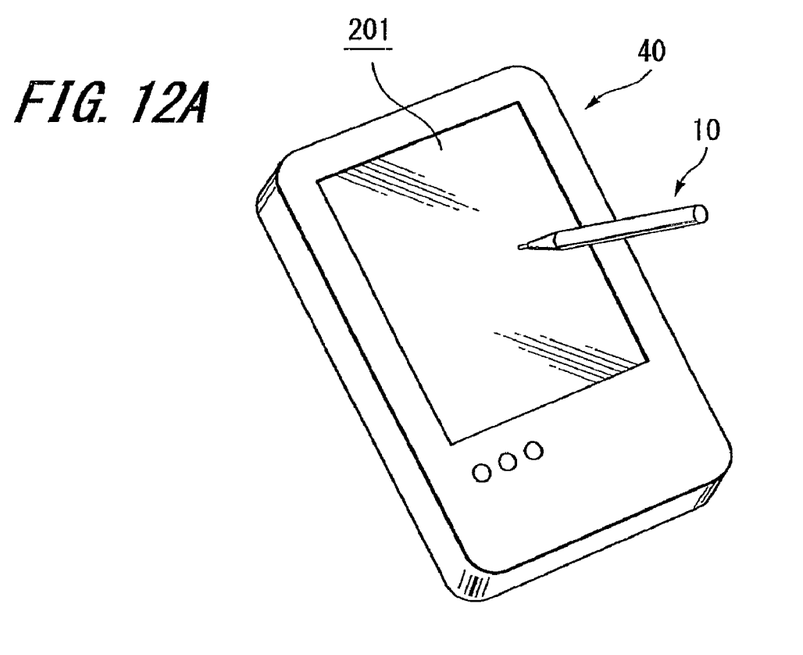
FIG. 12A is a perspective view illustrating an overall position detector formed in a PDA.
Figure 12B:
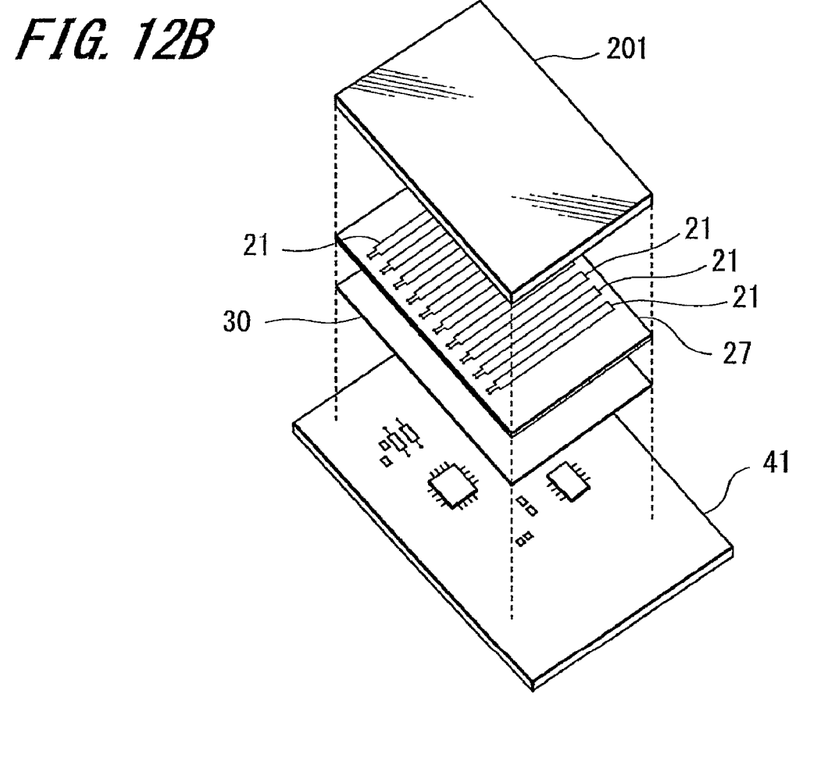
FIG. 12B is an exploded perspective view illustrating major parts thereof according to an embodiment of the invention.

FIG. 12A is an overall view illustrating one example of a personal digital assistant (PDA) 40 as a mobile electronic apparatus, whereas FIG. 12B is an exploded perspective view illustrating the main components of such PDA 40. FIG. 12B shows that a position detector of the PDA 40 includes the display panel 201, the sensor substrate 27, the magnetic path plate 30, and a display panel driving circuit board 41 located therebeneath. The display panel 201 in this embodiment is a liquid crystal panel.

The position detector of the embodiment includes the sensor coils 21 arranged between the position indicator 10 and the magnetic path plate 30, and hence noise generated by the display panel driving circuit board 41 can be cut off. Further, attenuation of the magnetic field due to eddy current can be lowered.

Since the position detector of the embodiment includes the magnetic path plate 30 having the amorphous layer 31 and the non-amorphous layer 32, for which aluminum may be used, the position detector of the embodiment can be effectively reduced in weight in comparison with the position detector having the related art silicon steel plate for electromagnetic shielding. Thus, the position detector of the embodiment can be used, in combination with the position indicator, in an electronic organizer, a portable video game player, and a mobile phone as well as the PDA.

FIGS. 10 to 12A, 12B show the embodiments of the display panel 201 having a liquid crystal panel; however, the embodiments are not limited thereto, and a display panel having an electroluminescence device or a light emitting diode may also be used. In addition, a display panel for a display device known as an electronic paper, or a plasma display, may be used.

Figure 13:
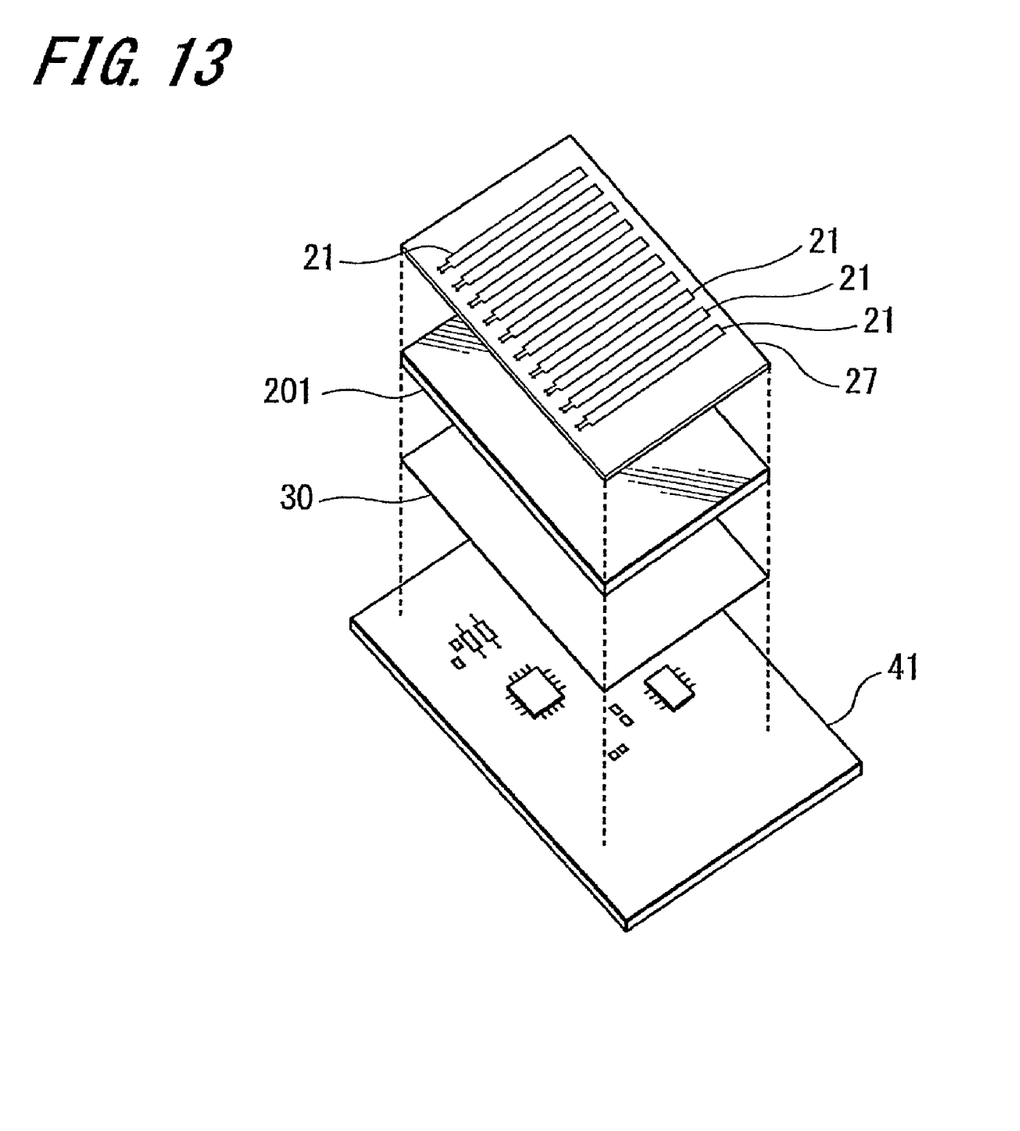
FIG. 13 is an exploded perspective view illustrating major parts of another example of a display device according to an embodiment of the invention.

FIG. 13 illustrates another example of a display device, in which the sensor substrate 27 is located above the display panel 201. The sensor substrate 27 includes a transparent substrate such as glass, while the sensor coil(s) 21 are formed with fine lines generally invisible to the naked eye, and are formed of a transparent conducting material such as indium tin oxide (ITO). Since light passes through the sensor substrate 27 and the sensor coil(s) 21 are invisible to the naked eye, the sensor substrate 27 can be arranged on the surface of the display panel 201 (i.e., a display surface).

In this configuration, the display panel 201 is located beneath the sensor substrate 27 on which the position indicator 10 (not shown in this figure) can be placed for position indication. The magnetic path plate 30 is placed beneath the display panel 201. Further, the display panel driving circuit board 41 is located beneath the magnetic path plate 30. In other words, the magnetic path plate 30 is placed between the sensor substrate 27, located on the display panel 201, and the display panel driving circuit board 41. A further material for forming the sensor coil(s) 21 may include metallic fine conductor lines in addition to the transparent conductive material.

It should be understood by those skilled in the art that various modifications, combinations, sub-combinations and alterations may occur depending on design requirements and other factors insofar as they are within the scope of the appended claims or the equivalents thereof.

What is claimed is:

1. A position detecting system comprising:
   a sensor substrate having a sensor coil for receiving an electromagnetic wave output from a position indicator;
   a magnetic path plate comprising a stack of an amorphous layer and a non-amorphous layer, and the plate being arranged at a side of the sensor substrate opposite to a side facing the position indicator; and
   a display unit placed between the sensor substrate and the magnetic path plate,
   wherein:
   the sensor substrate has transparency,
   the magnetic plate is placed such that its amorphous layer is placed between the display unit and the non-amorphous layer,
   the amorphous layer is configured, based on its relative magnetic permeability, to form a magnetic path for magnetic flux generated by the sensor coil of the sensor substrate, and to prevent attenuation of the magnetic flux generated by the sensor coil of the sensor substrate due to eddy current loss, and
   the non-amorphous layer is configured as aluminum having relative magnetic permeability that is lower than that of the amorphous layer, and having conductivity to shield the sensor substrate from electromagnetic noise.

2. The position detecting system according to claim 1, wherein the amorphous layer comprises a plurality of amorphous metal strips.

3. The position detecting system according to claim 1, wherein the display unit comprises a liquid crystal display unit.

4. A method of forming a position detecting system, the method comprising:
   providing a sensor substrate having a sensor coil for receiving an electromagnetic wave output from a position indicator, the sensor substrate having transparency;

providing a display unit at a side of the sensor substrate opposite to a side facing the position indicator; and providing a magnetic path plate comprising a stack of an amorphous layer and a non-amorphous layer formed of aluminum with relative magnetic permeability lower than that of the amorphous layer, the magnetic path plate being provided such that its amorphous layer is placed between the display unit and the non-amorphous layer, wherein the amorphous layer is provided to form a magnetic path for magnetic flux generated by the sensor coil of the sensor substrate, and to prevent attenuation of the magnetic flux generated by the sensor coil of the sensor substrate due to eddy current loss, and wherein the non-amorphous layer is provided to shield the sensor substrate from electromagnetic noise based on its conductivity.

* * * * *